United States Patent
Kawaguchi (10) Patent No.: US 8,768,364 B2
(45) Date of Patent: Jul. 1, 2014

(54) FEMTO CELL SYSTEM AND METHOD OF ACHIEVING MOBILITY WITH MACRO/MICRO CELL IN FEMTO CELL SYSTEM

(75) Inventor: Kenji Kawaguchi, Tokyo (JP)

(73) Assignee: NEC Corporation, Tokyo (JP)

( * ) Notice: Subject to any disclaimer, the term of this patent is extended or adjusted under 35 U.S.C. 154(b) by 139 days.

(21) Appl. No.: 13/258,904

(22) PCT Filed: Mar. 23, 2010

(86) PCT No.: PCT/JP2010/054927
§ 371 (c)(1), (2), (4) Date: Sep. 22, 2011

(87) PCT Pub. No.: WO2010/110240
PCT Pub. Date: Sep. 30, 2010

(65) Prior Publication Data
US 2012/0015660 A1    Jan. 19, 2012

(30) Foreign Application Priority Data
Mar. 23, 2009  (JP) ................................ 2009-070632

(51) Int. Cl.
*H04W 36/00* (2009.01)
*H04W 4/00* (2009.01)

(52) U.S. Cl.
USPC ............ 455/444; 455/443; 455/436; 370/331

(58) Field of Classification Search
CPC .... H04W 36/04; H04W 36/08; H04W 84/045
USPC .......................... 455/444, 443, 436; 370/331
See application file for complete search history.

(56) References Cited

U.S. PATENT DOCUMENTS

2008/0132239 A1*  6/2008  Khetawat et al. ............. 455/438

FOREIGN PATENT DOCUMENTS

| CN | 101370306 A | 2/2009 |
|---|---|---|
| WO | 2008094333 A | 8/2008 |

OTHER PUBLICATIONS

International Search Report for PCT/JP2010/054927 mailed May 18, 2010.
Chinese Office Action for CN Application No. 201080013644.4 issued on Oct. 24, 2013 with English Translation.

* cited by examiner

*Primary Examiner* — Omoniyi Obayanju
(74) *Attorney, Agent, or Firm* — Sughrue Mion, PLLC (57) ABSTRACT

A node that manages a plurality of femto cells identifies the femto cells that use an identical scrambling code, transfers a relocation request from the macro/micro network of a moving source to the femto cells and obtains information from a correct moving destination to achieve inter-network mobility of the mobile station.

10 Claims, 7 Drawing Sheets

LIST OF CELLS
REGISTERED IN RNC 201

| SC | Cell |
|---|---|
| SC#a | Cell#A |
| SC#b | Cell#B |
| SC#c | Cell#C |
| SC#d | Cell#D |

LIST OF FEMTO BASE STATIONS
UNDER CONTROL OF HNB-GW
401

| HNB | SC | Cell |
|---|---|---|
| 501 | SC#a | Cell#AA |
| 502 | SC#a | Cell#BB |
| 503 | SC#b | Cell#CC |

FEMTO CELL SYSTEM AND METHOD OF ACHIEVING MOBILITY WITH MACRO/MICRO CELL IN FEMTO CELL SYSTEM

TECHNICAL FIELD

Related Application

The present invention is based upon and claims the benefit of the priority of Japanese Patent Application No. 2009-070632 (filed on Mar. 23, 2009), the disclosure of which is incorporated herein in its entirety by reference.

The present invention relates to a communication system. More specifically, the invention relates to a femto cell system and a method of achieving mobility.

BACKGROUND

Information notified from a mobile station in W-CDMA (Wideband Code Division Multiple Access) or the like, for identifying the cell of a moving destination, is a scrambling code (Scrambling Code) alone. A base station control apparatus (RNC: Radio network Controller) performs mapping between the scrambling code and the cell ID (Cell ID), using a management table held in the controller, thereby identifying the cell of the moving destination.

Figure 3:
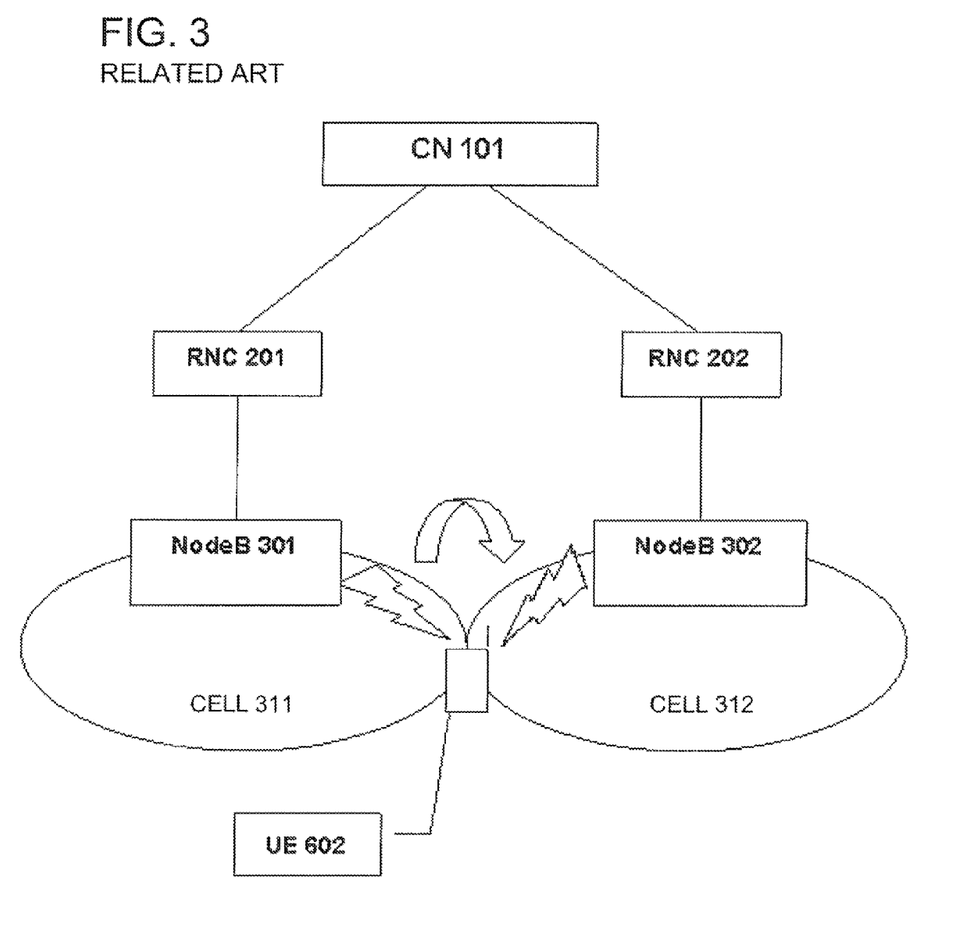
FIG. 3 is a diagram showing an example of an existent network configuration.

A femto cell (femto cell) is a small base station that is installed in home as well. Automatic setting is performed for the scrambling code and the frequency of the femto cell to be used so that the scrambling code and the frequency are not duplicately used by a different cell. A mobility process will be described with reference to FIG. 3. A network configuration in FIG. 3 is constituted from base station control apparatuses (RNCs) 201 and 202, base station apparatuses (Node Bs) 301 and 302 that respectively control cells 311 and 312. A plurality of base station controllers and a plurality of base stations cover a macro/micro area.

A core network (CN) 101, which is a higher-level node, is connected to the base station control apparatuses (RNCs) 201 and 202. A mobile station (UE: User Equipment) 602 can move between macro/micro cells. While a femto cell can cover an area of several ten meters, a macro cell can cover an area of several kilo meters or more. For that reason, when a lot of femto cells are installed under the control of a macro network or a micro network due to introduction of the femto cells, a lot of the femto cells that use an identical scrambling code are present within a macro/micro cell. An RNC in the macro network or the micro network cannot correctly identify the cell of a moving destination just with scrambling code information notified from the mobile station.

SUMMARY

The following analyses will be given below by the present invention.

As described before, a scrambling code of a cell and a cell ID of a cell of a moving destination are in a one-to-one correspondence, and a base station control apparatus (RNC) identifies the cell of the moving destination according to a scrambling code notified from a mobile station.

When a plurality of cells that uses an identical scrambling code are present under the control of the macro/micro cell due to the introduction of femto cells, the base station control apparatus (RNC) cannot identify a cell of a moving destination.

Further, each time when a new femto cell base station is installed due to introduction of the femto cells, setting of neighboring cells (updating of a table that manages neighboring cells or the like) in the macro/micro network needs to be updated for a base station control apparatus (RNC). However, the number of neighboring cells that can be registered is limited. Accordingly, registration of cell information on all femto cell base stations may not be able to be performed.

Accordingly, an object of the present invention is to provide a method and a system that allow inter-network mobility of a mobile station, without giving a change to a macro/micro network, even when a plurality of moving destination cells are present.

According to the present invention, there is provided a method, comprising: identifying, in a node that manages a plurality of femto cells, femto cells that use an identical scrambling code; and the node transferring a relocation request from a macro/micro network of a moving source to each of the femto cells, and obtaining information from a correct femto cell of a moving destination to achieve inter-network mobility of a mobile station.

According to the present invention, there is provided a system, wherein a node that manages a plurality of femto cells identifies femto cells that use an identical scrambling code; and the node transfers a relocation request from a macro/micro network of a moving source to each of the femto cells, and obtains information from a correct femto cell of a moving destination to achieve inter-network mobility of a mobile station.

According to the present invention, there is provided a gateway apparatus that manages a plurality of femto base stations, comprising a management table including a scrambling code that the femto base station uses for each of said plurality of femto base stations, wherein the gateway apparatus receives through a higher-level core network a relocation request from a base station control apparatus in a macro/micro network of a moving source of a mobile station, searches the management table to identify femto cells that use an identical scrambling code, and transfers the relocation request from the macro/micro network of the moving source to femto base stations that use an identical scrambling code, and notifies an acknowledgement of the relocation request to the base station control apparatus through the higher-level core network, upon receipt of a relocation request acknowledge message from each of the femto base stations, thereby achieving mobility of the mobile station from the macro/micro network to a femto network.

According to the present invention, even when a plurality of moving destination cells are present, inter-network mobility of a mobile station can be achieved without giving a change to the macro/micro network.

Still other features and advantages of the present invention will become readily apparent to those skilled in this art from the following detailed description in conjunction with the accompanying drawings wherein only exemplary embodiments of the invention are shown and described, simply by way of illustration of the best mode contemplated of carrying out this invention. As will be realized, the invention is capable of other and different embodiments, and its several details are capable of modifications in various obvious respects, all without departing from the invention. Accordingly, the drawing and description are to be regarded as illustrative in nature, and not as restrictive.

PREFERRED MODES

Following describes exemplary embodiments of the present invention. In exemplary embodiments of the present invention, a node (gateway) that manages a plurality of femto base stations identifies femto cells that use an identical scrambling code, and transfers a relocation request from a macro/micro network of a moving source to femto base stations that use an identical scrambling code, and obtaining information from a correct moving destination to achieve inter-network mobility of a mobile station. In node switching from a macro network or a micro network to a femto network, correct switching to the node of a femto cell system can be achieved without affecting the micro network and the macro network. According to the present invention, even if a plurality of candidates are present as a cell for a moving destination in the femto cell system, a correct address can be identified, and a relocation function can be executed.

First Exemplary Embodiment

Figure 1:
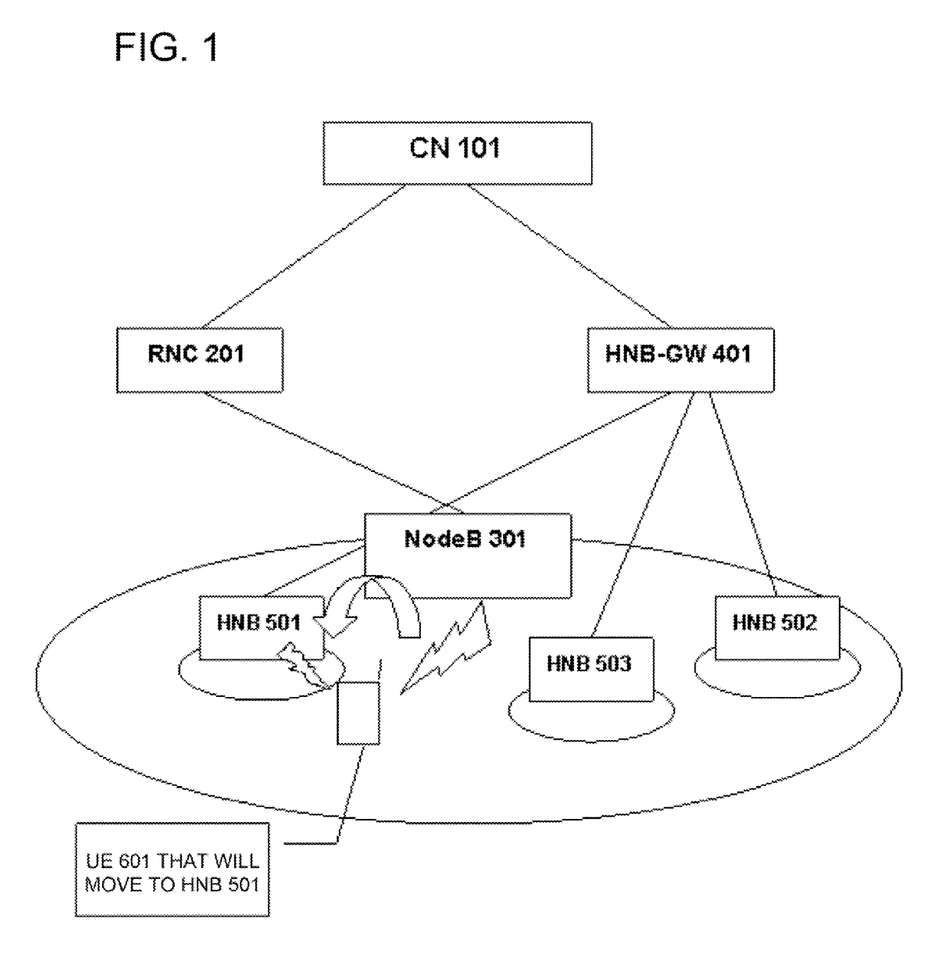
FIG. 1 is a diagram showing a network configuration of a femto cell system in an exemplary embodiment of the present invention.

FIG. 1 is a diagram showing a network configuration of a femto cell system according to a first exemplary embodiment of the present invention. Referring to FIG. 1, there are provided a base station control apparatus (RNC) 201 that covers a macro/micro cell network, a base station apparatus (Node B) 301, a femto gateway (HNB-GW) 401 that covers a femto cell network, and a plurality of femto base station apparatuses (HNBs: Home Node Bs) 501, 502, and 503. There are a plurality of femto cell areas in one macro/micro cell area.

A core network (CN: Core Network) 101, which is a higher-level node, is connected to both of the macro/micro cell network and the femto cell network.

A mobile station (UE: User Equipment: also referred to as a "terminal") 601 can move between a macro/micro cell and a femto cell.

The femto base station apparatuses (HNBs) 501, 502, and 503 are connected to the femto gateway (HNB-GW) 401 through the Internet or the like.

Figure 2A:
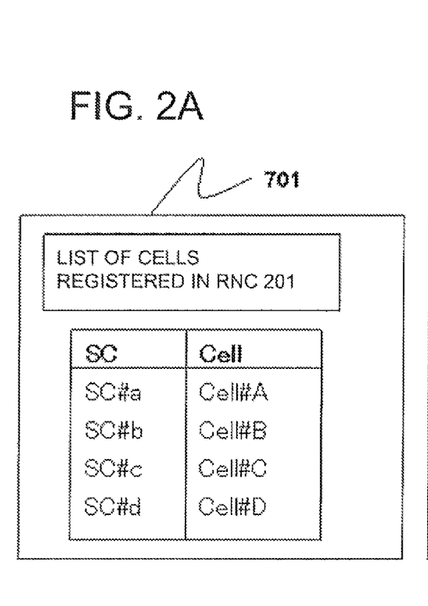
FIGS. 2A and 2B include tables each showing an example of a management table held by a femto gateway in the exemplary embodiment of the present invention.
Figure 2B:
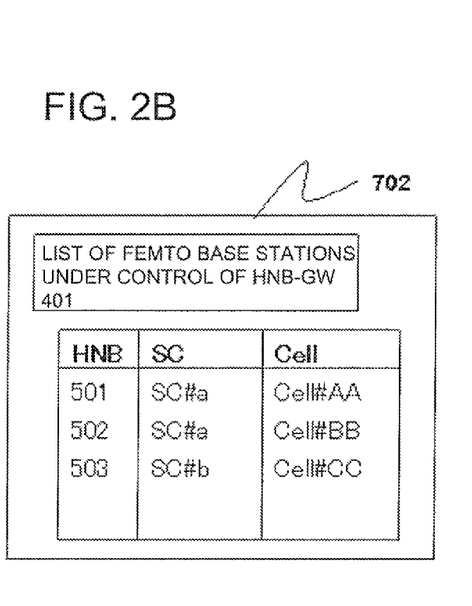

As shown in FIGS. 2A and 2B, the femto gateway (HNB-GW) 401 includes a table 702 for managing femto base stations (HNBs) in association with scrambling codes (SCs) used by the femto base stations (HNBs), and cell IDs (CELLs) (which is a list of the femto base stations under the control of the femto gateway (HNB-GW) 401) (refer to FIG. 2B, and a table 701 for associating cell Ws (CELLs) with scrambling codes (SCs) and scrambling codes (SCs) to be used by femto cell system that have in advance registered in the RNC 201 (refer to FIG. 2A). While FIG. 2A and FIG. 2B show the management tables held by the femto gateway (HNB-GW) 401, the table 701 in FIG. 2A is a list of cells registered in the base station control apparatus (RNC) 201, and the same information as that in the table 701 is therefore held in the base station control apparatus (RNC) 201 as well.

The base station control apparatus (RNC), 201 holds ID information on RNCs assigned to the femto gateway (HNB-GW) 401 as information on neighboring RNCs and cell information to be used by the femto gateway (HNB-GW) 401.

An MSC (Mobile Switching Center) that carries out a circuit switching service and an SGSN (Servicing GPRS (General Packet Radio Service) Support Node) that carries out a packet switching service are present in the core network (CN) 101 in FIG. 1. Since the MSC and the SGSN are well known by those skilled in the art and are not directly related to the subject of the present invention, detailed configurations of the MSC and the SGSN will be omitted.

Figure 4:
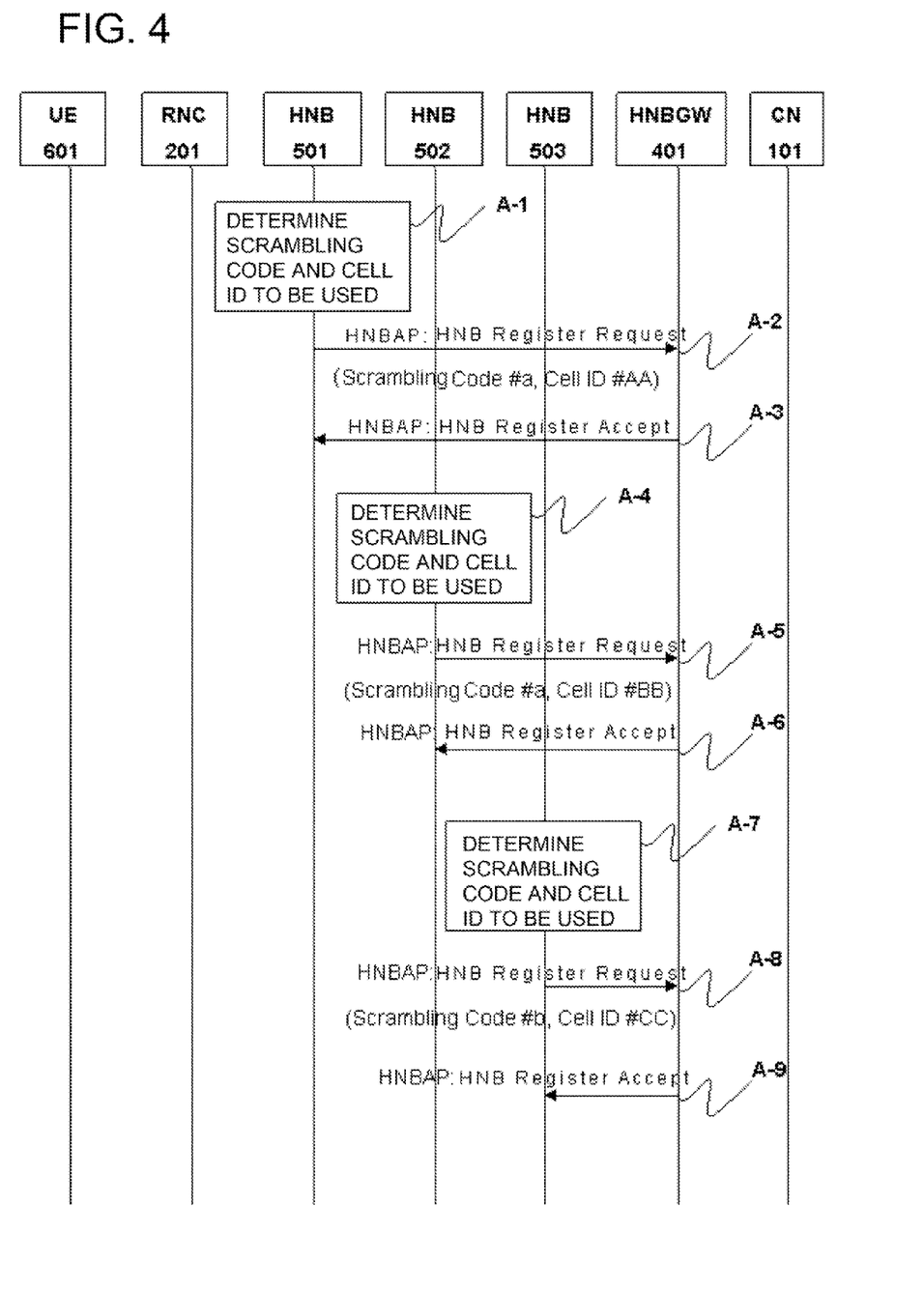
FIG. 4 is a sequence diagram showing an HNB registration operation in the exemplary embodiment of the present invention.
Figure 5:
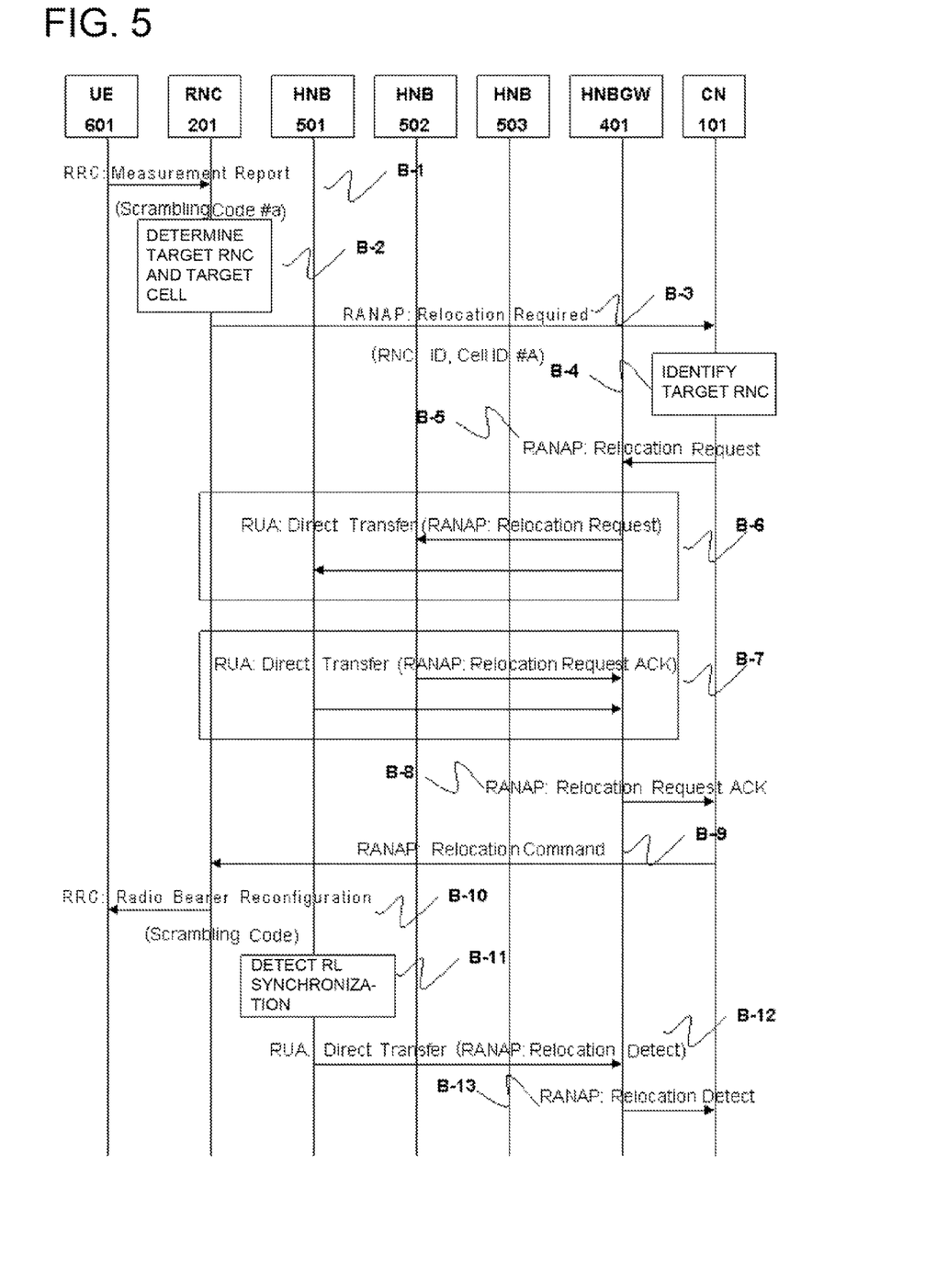
FIG. 5 is a diagram showing a process sequence 1 in the exemplary embodiment of the present invention.
Figure 6:
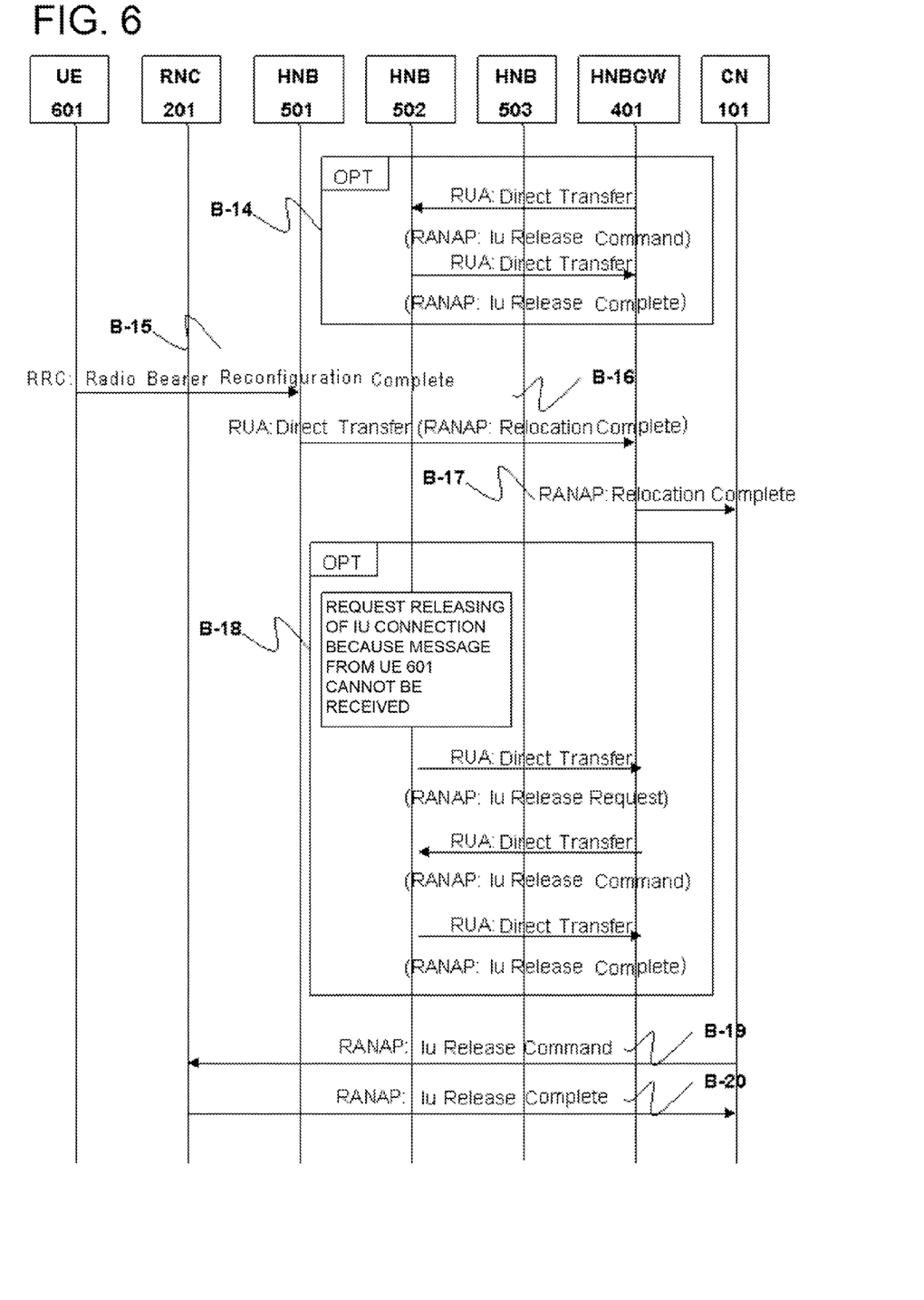
FIG. 6 is a diagram showing a process sequence 2 in the exemplary embodiment of the present invention.

Following describes an operation of mobility from the macro/micro network to the femto network, with reference to sequence diagrams in FIGS. 4, 5, and 6. Referring to FIGS. 4, 5, and 6, a UE601, an RNC 201, HNBs 501, 502, and 503, an HNB-GW 401, and a CN101 respectively correspond to the mobile station (UE) 601, the base station control apparatus (RNC) 201, the femto base station apparatuses (HNBs) 501, 502, and 503, the femto gateway (HNB-GW) 401, and the core network (CN) 101.

FIG. 4 shows an example of a procedure of a preliminary process in which, when each HNB is installed in home or the like, information is registered in the HNB-GW 401 connected to the HNB.

The HNB 501 monitors a surrounding environment before starting a service, and selects an optimum one of scrambling codes. The HNB 501 uses a cell ID value that does not coincide with a different femto base station (in step A-1).

The HNB 501 notifies a selected scrambling code #a and a cell ID #AA to the HNB-GW 401 (with an HNBAP (Home Node B Application Protocol): HNB Register Request) (in step A-2), and registers in the HNB-GW 401 that the HNB 501 is a new HNB. In that case, the HNB-GW401 permits registration when the HNB 501 is acceptable, and notifies permission to the HNB 501 (with an HNBAP: HNB Register Accept message) (in step A-3).

Similarly, the HNB 502 also monitors a surrounding environment before starting a service, and selects an optimum one of scrambling codes. In this case, the HNB 501 is present outside an area that can be monitored by the HNB 502. Thus, the HNB 502 selects the scrambling code #a which is the same as that of the HNB 501 (in step A-4). Then, the HNB 502 requests to the HNB-GW 401 new registration of the HNB, using the scrambling code #a together with a cell ID #BB (in step A-5). Then, the registration in the HNB-GW401 is permitted (in step A-6).

The HNB 503 also monitors a surrounding environment before starting a service. However, the HNB 502 is present in an area that can be monitored by the HNB 503. Accordingly, the HNB 503 selects a scrambling code #b which is different from that of the HNB 502 (in step A-7). Then, the HNB 503 requests to the HNB-GW 401 new registration of the HNB, using the scrambling code #b and a cell ID #CC (in step A-8). Then, the registration in the HNB-GW401 is permitted (in step A-9).

By executing the above-mentioned processes, each of the three HNBs 501, 502, and 503 starts service by receiving a radio electric wave under the control of the HNB-GW 401. The HNB-GW 401 holds information used by each femto base station (such as scrambling code and cell ID of a femto base station) as the management table (refer to FIGS. 2A and 2B).

Following describes a procedure for mobility from the macro/micro network to the femto network in this exemplary embodiment with reference to FIGS. 2, 5, and 6.

While this exemplary embodiment shows a configuration in which three HNBs 501, 502, and 503 are installed in a macro/micro network, a femto cell base station which is going to be installed in the future is also present. For that reason, a list of scrambling codes and a list of cell IDs corresponding to the scrambling codes (of the table 701) which will be used by a cells under the control of the HNB-GW 401 are registered in the RNC 201 in advance, as shown in of FIG. 2A.

In the HNB-GW 401, mapping between scrambling code and cell ID is performed. Thus, there is no problem that cell IDs registered in advance in the RNC 201 and cell IDs used by the HNBs are not the same.

As a trigger for movement to a macro network, the RNC 201 receives from a UE 601 information of a scrambling code #a with an RRC (Radio Resource Control): Measurement Report message (measurement report result transfer signal through an RRC protocol) (in step B-1).

The RNC 201 obtains information on a network of a moving destination and a cell ID from a database (table) held inside the RNC 201 (in step B-2).

Since the moving destination is not a cell under control of the RNC 201, the RNC 201 transmits to the CN 101, which is the higher-level node, a RANAP (Radio Access Network Application Part protocol): Relocation Required message that requests a position change for a network which manages cells of the moving destination (in step B-3).

The CN 101 identifies a target RNB, based on the RNC ID notified from the RNC 201 (in step B-4), and transmits a RANAP: Relocation Request (relocation request) message to a HNB-GW 401 (in step B-5).

The HNB-GW 401 that has received the RANAP: Relocation Request (relocation request) message from the CN 101, searches the scrambling code associated with the cell ID #A from the table 701 in FIG. 2A, based on the information of the cell ID #A received from the RNC 201 through the CN 101. The HNB-GW 401 obtains the scrambling code #a associated with the cell ID #A and searches the table 702 in FIG. 2B, thereby identifying femto base stations that use an identical scrambling code #a.

In this case, it can be seen from the table 702 in FIG. 2B that the femto base stations using the scrambling code #a are the HNBs 501 and 502. Thus, the HNB-GW 401 converts cell ID information in the RANAP: Relocation Request (relocation request) message received from the CN 101 to cell ID information held by each femto base station, for transfer to each of the HNB 501 and the HNB 502 (in step B-6). In that case, the HNB-GW 401 performs the transfer to each of the HNB 501 and HNB 502, with a RUA (RANAP User Application): Direct Transfer (RANAP: Relocation Request) message.

Each of the HNB 501 and the HNB 502 that have received the message from the HNB-GW 401 sends a reply indicating an acknowledgement of the request to the HNB-GW 401 (in step B-7).

After receiving the messages from the femto base stations, the HNB-GW 401 transmits a RANAP: Relocation Request ACK (relocation request acknowledge) message to the CN 101 just once (in step B-8).

The CN 101 notifies permission from the network of the moving destination to the RNC 201 (in step B-9).

The RNC 201 requests the UE 601 to perform inter-cell movement using a RANAP: Relocation Command (relocation command) message from the CN 101 as a trigger (in step B-10).

The UE 601 takes radio synchronization with the cell of the moving destination (in step B-11). The HNB 501 that could establish the radio synchronization notifies to the HNB-GW 401 that the movement of the UE 601 could be detected (in step B-12). The HNB-GW 401 transmits the result to the CN 101 as a RANAP: Relocation Detect (relocation detect) message (in step B-13).

The HNB 502 also performs a process of mobility detection of a mobile station between networks, like the HNB 501. However, since the HNB 501 could detect the movement of the UE 601, the HNB-GW 401 can also request stop of the process to the HNB 502. The HNB 502 finishes the process according to the request for the stop from the HNB-GW 401 (in step B-14).

The UE 601 notifies to the HNB 501 completion of the movement between the networks with a RRC: Radio Bearer Reconfiguration Complete (radio bearer reconfiguration complete) message (in step B-15).

The HNB 501 notifies to the CN 101 completion of the movement of the UE 601 1 with a RANAP: Relocation Complete (relocation complete) message through the HNB-GW 40 (in step B-16).

When the request for stopping the process is not made to the HNB 502, there is a possibility that a request for releasing an Iu connection (signaling connection between the SGSN and the RNC) may be transmitted from the HNB 502 to the HNB-GW 401.

However, since completion of the process of the movement between the networks is notified to the CN 101, the HNB-GW 401 generates a response message (RANAP: Iu Release Command message) for the request for releasing the Iu connection, thereby releasing connection with the HNB 502 (in step B-18).

The CN 101 knows completion of network switching by the RANAP: Relocation Complete message. Thus, the CN 101 executes a process of releasing the Iu connection for the RNC 201 of a moving source (in step B-19). Then, the network switching is completed (in step B-20).

The following operations and effects are achieved according to this exemplary embodiment described above.

Even in a situation where a plurality of moving destination cells are present, mobility of a mobile station from a macro/micro network to a femto network can be achieved, without giving a change to a moving source network.

Mobility of a mobile station from a macro/micro network to a femto network can be achieved accompanied with registration of minimal neighboring cells.

Second Exemplary Embodiment

Figure 7:
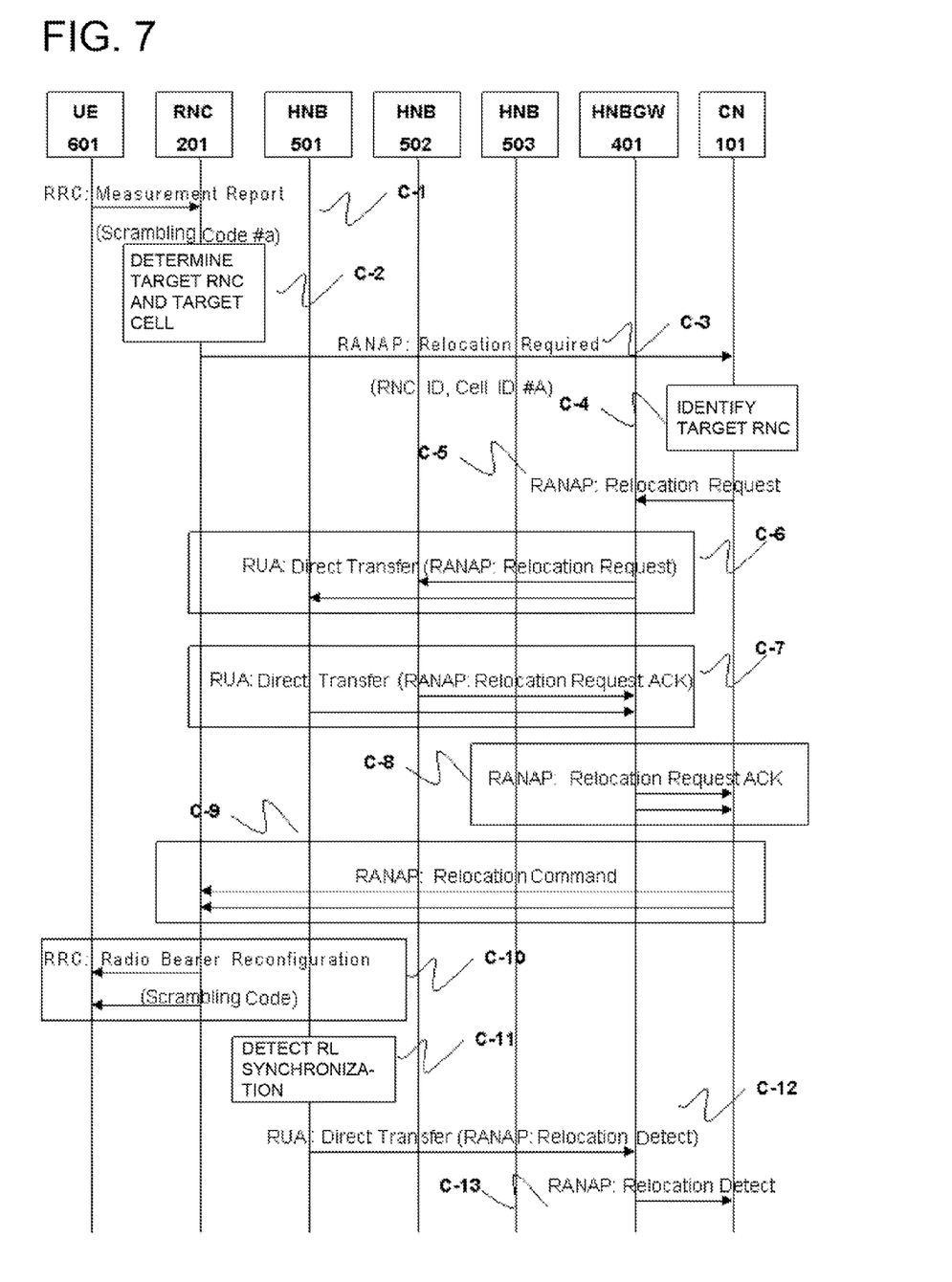
FIG. 7 is a diagram showing a process sequence in another exemplary embodiment of the present invention.

The following describes a second exemplary embodiment of the present invention. The second exemplary embodiment of the present invention has a same basic configuration as the first exemplary embodiment. However, even when a scrambling code to be used is not notified from a femto basic station, the HNB-GW 401 performs broadcasting to all of femto basic stations (HNBs) under the control of the HNB-GW 401, thus enabling inter-network mobility of a mobile station. In the second exemplary embodiment of the present invention, the HNB-GW 401 transfers all RUA: Direct Transfer (RANAP: Relocation Request ACK) messages received from the femto base stations (HNBs) to the RNC 201 of the moving source to achieve the inter-network mobility. FIG. 7 is a diagram showing a process sequence in the second exemplary embodiment of the present invention. Operation of the second exemplary embodiment of the present invention will be described with reference to FIGS. 1, 2, and 7.

The RNC 201 receives from the UE 601 the RRC: Measurement Report message (measurement report result transfer signal through the RRC protocol). The RNC 201 transmits the RANAP: Relocation Required (relocation required) message to the CN 101. The CN 101 transmits the RANAP: Relocation Request (relocation request) message to the HNB-GW 401. The above-mentioned sequences (C-1 to C-5) are the same as those in the first exemplary embodiment.

The HNB-GW 401, which has received the RANAP: Relocation Request message from the CN 101, searches a scrambling code associated with a cell ID #A from the table 701 in FIG. 2A and the table 702 in FIG. 2B based on the information of the cell ID #A received from the RNC 201 through the CN 101, thereby identifying the femto base stations that use an identical scrambling code.

The HNB-GW 401 refers to the management table 702 in the HNB-GW 401. Since it is found that femto base stations using the scrambling code #a are the HNB 501 and the HNB 502, the HNB-GW 401 converts cell ID information in the RANP: Relocation Request message received from the CN 101 to cell ID information held by each femto base station. Then, the HNB-GW 401 transfers the RUA: Direct Transfer message.

Each of the HNB 501 and the HNB 502 receives the message from the HNB-GW 401 (in step C-6), and sends a reply indicating an acknowledgement of the request to the HNB-GW 401 (in step C-7).

After receiving the message from each of the two HNBs 501 and 502, the HNB-GW 401 places received message on the RANAP: Relocation Request ACK (relocation request acknowledge) message, and transmits the RANAP: Relocation Request ACK (relocation acknowledge) message to the CN 101, the number of times (in this example, twice) at which the HNB-GW401 has received the message from the HNBs 501 and 502 (in step C-8).

The CN 101 notifies permission from the network of a moving destination to the RNC 201 the plurality of the number of times (in step C-9).

The RNC 201 requests the UE 601 to perform inter-cell movement just the number of times at which the RNC 201 has received the RANAP: Relocation Command message from the CN 101 (in step C-10).

The UE 601 establishes radio synchronization with the femto cell (HNB) of the moving destination.

Though the plurality of the femto cells are included as moving destination targets, only the HNB 501 that has succeeded in establishing radio synchronization notifies to the HNB-GW 401 that movement of the UE 601 could be detected (with a (RUA: Direct transfer (RANAP: Relocation Detect) message) (in step C-12). The HNB-GW 401 transmits the result to the CN 101 (as the RANAP: Relocation Detect (relocation detect) message) (in step C-13). Subsequent operations are same as those in the first exemplary embodiment (shown in FIG. 6). Thus, detailed description of the subsequent operations will be omitted.

Modifications and adjustments of the exemplary embodiments and an example are possible within the scope of the overall disclosure (including claims) of the present invention, and based on the basic technical concept of the invention. Various combinations and selections of various disclosed elements are possible within the scope of the claims of the present invention. That is, the present invention of course includes various variations and modifications that could be made by those skilled in the art according to the overall disclosure including the claims and the technical concept.

The whole or part of the exemplary embodiments disclosed above can be described as, but not limited to, the following Supplementary notes.

(Supplementary Note 1)

A method of achieving mobility with a macro/micro cell in a femto cell system, comprising:

identifying, by a node that manages a plurality of femto cells, the femto cells that use an identical scrambling code; and the node transferring a relocation request from a macro/micro network of a moving source to the plurality of femto cells and obtaining information from a correct femto cell of a moving destination to achieve inter-network mobility of a mobile station.

(Supplementary Note 2)

The method of achieving mobility with a macro/micro cell in a femto cell system according to Supplementary note 1, wherein the node that manages the plurality of femto cells comprises a gateway that is connected to a plurality of femto base stations respectively corresponding to the plurality of femto cells and manages the plurality of femto cell base stations, wherein the gateway receives the relocation request from a base station control apparatus of the macro/micro network of the moving source through a higher-level core network.

(Supplementary Note 3)

The method of achieving mobility with a macro/micro cell in a femto cell system according to Supplementary note 2, comprising:

receiving scrambling code information from the mobile station, by the base station control apparatus;

obtaining information on a network and a cell ID of the moving destination, by the base station control apparatus;

transmitting a relocation required (Relocation Required) message to the core network when the moving destination is not a cell under the control of the base station control apparatus, by the base station control apparatus;

identifying a target base station control apparatus from a base station control apparatus ID notified from the base station control apparatus and transmitting a relocation request (Relocation Request) message to the gateway, by the core network;

searching from a management table the scrambling code associated with the cell ID for one of the femto base stations under the control of the gateway and identifying the femto base stations that use an identical scrambling code, by the gateway;

converting the cell ID information received from the core network to cell ID information held by each femto base station, for transfer to each of the femto base stations, by the gateway;

transmitting a relocation request acknowledge (Relocation Request ACK) message to the core network after receiving the relocation request acknowledge (Relocation Request ACK) message from each of the femto base stations, by the gateway;

notifying permission from the network of the moving destination to the base station control apparatus, by the core network;

requesting the mobile station to perform inter-cell movement, using a relocation command message from the core network as a trigger, by the base station control apparatus, and establishing radio synchronization with the cell of the moving destination, by the mobile station.

(Supplementary Note 4)

The method of achieving mobility with a macro/micro cell in a femto cell system according to Supplementary note 3, comprising:

notifying to the gateway that the movement of the mobile station could be detected, by the femto base station that succeeds in establishing radio synchronization with the mobile station; and transmitting a relocation detect (Relocation Detect) message to the core network, by the gateway.

(Supplementary Note 5)

The method of achieving mobility with a macro/micro cell in a femto cell system according to Supplementary note 4, comprising:

notifying to the femto base station completion of the inter-network mobility, with a radio bearer reconfiguration complete message, by the mobile station; and notifying to the core network completion of the movement of the mobile station, through the gateway, with a relocation complete message, by the femto base station.

(Supplementary Note 6)

The method of achieving mobility with a macro cell/micro cell in a femto cell system according to Supplementary note 5, comprising:

generating a response message (Iu Release Command) for an Iu connection release request, thereby releasing connection with a different one of the femto base stations to which an identical scrambling code as the scrambling code of the femto base station has been assigned, by the gateway; and knowing completion of network switching by the relocation complete message and transmitting a connection release process (Iu Release Command message) to the base station control apparatus of the moving source, by the core network.

(Supplementary Note 7)

The method of achieving mobility with a macro cell/micro cell in a femto cell system according to any one of Supplementary notes 1 to 6, comprising:

monitoring a surrounding environment before a service is started, selecting the scrambling code, and requesting new registration of the femto base station to the gateway using the scrambling code together with the cell ID from which the scrambling code has been selected, thereby performing the registration in the gateway, by the femto base station.

(Supplementary Note 8)

The method of achieving mobility with a macro cell/micro cell in a femto cell system according to any one of Supplementary notes 1 to 6, comprising:

performing broadcasting to all the plurality of femto base stations under the control of the gateway to achieve the inter-network mobility of the mobile device when the scrambling code is not informed from the femto base station.

(Supplementary Note 9)

The method of achieving mobility with a macro cell/micro cell in a femto cell system according to Supplementary note 8, comprising:

searching from the management table the scrambling code associated with the cell ID based on the cell ID information received from the base station control apparatus through the core network, identifying the femto base stations that use an identical scrambling code, and converting the cell ID information in the relocation request message received from the core network to the cell ID information held by each femto base station, for transfer, by the gateway that has received the relocation request (Relocation Request) message;

after receiving a plurality of messages received from the femto base stations, placing the plurality of messages received on a relocation request acknowledge response message and transmitting the relocation request acknowledge response message to the core network just the number of times at which the gateway has received the message, by the gateway;

notifying the permission from the network of the moving destination to the base station control apparatus the plurality of times, by the core network; requesting the mobile station to perform the inter-cell movement of the mobile station just the number of times at which the base station control apparatus has received the relocation command message from the core network, by the base station control apparatus;

establishing the radio synchronization with the femto base station of the cell targeted as the moving destination, by the mobile station, and notifying to the gateway that the movement of the mobile station could be detected, by the femto base station that could take the radio synchronization; and transmitting the relocation detect message to the core network, by the gateway.

(Supplementary Note 10)

A femto cell system, wherein a node that manages a plurality of femto cells identifies femto cells that use an identical scrambling code; and the node transfers a relocation request from a macro/micro network of a moving source to the plurality of femto cells and obtains information from a correct femto cell of a moving destination to achieve inter-network mobility of a mobile station.

(Supplementary Note 11)

The femto cell system according to Supplementary note 10, wherein the node that manages the plurality of femto cells comprises a gateway that is connected to a plurality of femto base stations respectively corresponding to the plurality of femto cells and manages the plurality of femto base stations, wherein the gateway receives the relocation request from a base station control apparatus of the macro/micro network of the moving source through a higher-level core network.

(Supplementary Note 12)

The femto cell system according to Supplementary note 11, wherein the base station control apparatus receives scrambling code information from the mobile station, the base station control apparatus obtains information on a network and cell TD information of the moving destination, the base station control apparatus transmits a relocation required (Relocation Required) message to the core network when the moving destination is not a cell under the control of the base station control apparatus, the core network identifies a target base station control apparatus from a base station control apparatus ID notified from the base station control apparatus and transmits a relocation request [Relocation Request] message to the gateway, the gateway searches from a management table the scrambling code associated with the cell ID for one of the femto base stations under the control of the gateway and identifies the femto base stations that use an identical scrambling code, the gateway converts the cell ID information received from the core network to cell ID information held by each femto base station, for transfer to each of the femto base stations, the gateway transmits a relocation request acknowledge (Relocation Request ACK) message to the core network after receiving the relocation request acknowledge (Relocation Request ACK) message from each of the femto base stations, the core network notifies permission from the network of the moving destination to the base station control apparatus; and the base station control apparatus requests the mobile station to perform inter-cell movement, using a relocation command message from the core network as a trigger, by the base station control apparatus, and the mobile station establishes radio synchronization with the cell of the moving destination.

(Supplementary Note 13)

The femto cell system according to Supplementary note 12, wherein the femto base station that succeeds in establishing radio synchronization with the mobile station notifies to the gateway that the movement of the mobile station could be detected; and the gateway transmits a relocation detect (Relocation Detect) message to the core network.

(Supplementary Note 14)

The femto cell system according to Supplementary note 13, wherein the mobile station notifies to the femto base station completion of the inter-network mobility, with a wireless bearer reconfiguration complete message, and the femto base station notifies to the core network completion of the movement of the mobile station, through the gateway, with a relocation complete message.

(Supplementary Note 15)

The femto cell system according to Supplementary note 14, wherein the gateway generates a response message (Iu Release Command message) for an Iu connection release request, thereby releasing connection with a different one of the femto base stations to which an identical scrambling code as the scrambling code of the femto base station has been assigned, and the core network knows completion of network switching by the relocation completion message and transmits a connection release process (Iu Release Command message) to the base station control apparatus of the moving source.

(Supplementary Note 16)

The femto cell system according to any one of Supplementary notes 10 to 15, wherein the femto base station monitors a surrounding environment before a service is started, selects the scrambling code, and requests new registration of the femto base station to the gateway using the scrambling code together with the cell ID from which the scrambling code has been selected, thereby performing the registration in the gateway.

(Supplementary Note 17)

The femto cell system according to any one of Supplementary notes 10 to 15, wherein broadcasting is performing to all the plurality of femto base stations under the control of the gateway to achieve the inter-network mobility of the mobile station when the scrambling code is not informed from the femto base station.

(Supplementary note 18).

The femto cell system according to Supplementary note 17, wherein the gateway that has received the relocation request (Relocation Request) message searches from the management table the scrambling code associated with the cell ID based on the cell ID information received from the base station control apparatus through the core network, identifies the femto base stations that use an identical scrambling code, and converts the cell ID information in the relocation request message received from the core network to the cell ID information held by each femto base station, for transfer, the gateway after receiving a plurality of messages received from the femto base stations, places the plurality of messages received on a relocation request acknowledge response message and transmits the relocation request acknowledge response message to the core network just the number of times at which the gateway has received the message, the core network notifies permission from the network of the moving destination to the base station control apparatus the plurality of times; the base station control apparatus requests the mobile station to perform inter-cell movement of the mobile station just the number of times at which the base station control apparatus has received the relocation command message from the core network, the mobile station establishes the radio synchronization with the femto base station of the cell targeted as the moving destination, and the femto base station that could take the radio synchronization notifies to the gateway that the movement of the mobile station could be detected; and the gateway transmits the relocation detect message to the core network.

What is claimed is:

1. A method of achieving mobility with a macro/micro cell in a femto cell system, said method comprising:
   a node that manages a plurality of femto cells, identifying femto cells that use an identical scrambling code by searching a management table for a scrambling code associated with one or more cell IDs related to one of more femto cells of the plurality of femto cells managed by the node; and
   said node transferring a relocation request from a macro/micro network of a moving source of a mobile station to a plurality of femto cells and obtaining information from a femto cell of a correct moving destination of said mobile station to achieve inter-network mobility of said mobile station;
   wherein said searching said management table comprises identifying said femto cells by referring only to said management table without referring to information identifying the mobile station.

2. The method according to claim 1, wherein said node that manages said plurality of femto cells comprises a gateway that is connected to a plurality of femto base stations respectively corresponding to said plurality of femto cells and manages said plurality of femto base stations, wherein said method further comprises
   said gateway receiving said relocation request from a base station control apparatus of said macro/micro network of said moving source via a higher-level core network.

3. The method according to claim 2, further comprising:
   said base station control apparatus receiving scrambling code information from said mobile station;
   said base station control apparatus obtaining information on a network and a cell ID of said moving destination of said mobile station;
   said base station control apparatus transmitting a relocation required (Relocation Required) message to said core network, when said moving destination is not a cell under control of said base station control apparatus;
   said core network identifying a target base station control apparatus from a base station control apparatus ID notified from said base station control apparatus and transmitting a relocation request (Relocation Request) message to said gateway;
   said gateway converting said cell ID information received from said core network to cell ID information held by each femto base station and transferring said converted cell ID information to said plurality of femto base stations;
   said gateway transmitting a relocation request acknowledge (Relocation Request ACK) message to said core network after receiving said relocation request acknowledge (Relocation Request ACK) message from said plurality of femto base stations;
   said core network notifying permission from said network of said moving destination to said base station control apparatus; and said base station control apparatus requesting said mobile station to perform inter-cell movement, using a relocation command message from said core network as a trigger, and said mobile station establishing radio synchronization with said cell of said moving destination.

4. The method according to claim 3, further comprising:
said femto base station that succeeds in establishing said radio synchronization with said mobile station, notifying to said gateway that movement of said mobile station is able to be detected; and
said gateway transmitting a relocation detect (Relocation Detect) message to said core network.

5. The method according to claim 4, further comprising:
said mobile station notifying to said femto base station completion of said inter-network mobility, with a radio bearer reconfiguration complete message; and
said femto base station notifying to said core network completion of said movement of said mobile station, via said gateway, with a relocation complete message.

6. A femto cell system comprising:
a plurality of femto cells; and
a node that manages said plurality of femto cells, wherein
said node identifies femto cells that use an identical scrambling code by searching a management table for a scrambling code associated with one or more cell IDs related to one of more femto cells of the plurality of femto cells managed by the node, and
said node transfers a relocation request from a macro/micro network of a moving source of a mobile station to said plurality of femto cells, and obtains information from a femto cell of a correct moving destination of said mobile station to achieve inter-network mobility of said mobile station;
wherein said node identifies said femto cells by referring only to said management table without referring to information identifying the mobile station.

7. The femto cell system according to claim 6, wherein said node that manages said plurality of femto cells comprises
a gateway that is connected to a plurality of femto base stations respectively corresponding to said plurality of femto cells and manages said plurality of femto base stations, wherein said gateway receives said relocation request from a base station control apparatus of said macro/micro network of said moving source via a higher-level core network.

8. The femto cell system according to claim 7, wherein said base station control apparatus receives scrambling code information from said mobile station,
said base station control apparatus obtains information on a network and a cell ID of said moving destination of said mobile station,
said base station control apparatus transmits a relocation required (Relocation Required) message to said core network when said moving destination is not a cell under control of said base station control apparatus, said core network identifies a target base station control apparatus from a base station control apparatus ID notified from said base station control apparatus and transmits a relocation request (Relocation Request) message to said gateway, said gateway converts said cell ID information received from said core network to cell ID information held by each femto base station and transfers said converted cell ID information to said femto base stations, said gateway transmits a relocation request acknowledge (Relocation Request ACK) message to said core network after receiving said relocation request acknowledge (Relocation Request ACK) message from said femto base stations, said core network notifies permission from said network of said moving destination to said base station control apparatus, said base station control apparatus requests said mobile station to perform inter-cell movement, using a relocation command message from said core network as a trigger, and said mobile station establishes radio synchronization with said cell of said moving destination.

9. The femto cell system according to claim 8, wherein said femto base station that succeeds in establishing radio synchronization with said mobile station notifies to said gateway that said movement of said mobile station is detected, and said gateway transmits a relocation detect (Relocation Detect) message to said core network.

10. A gateway apparatus that manages a plurality of femto base stations, comprising:
a management table including a scrambling code that the femto base station uses for each of said plurality of femto base stations; and
a unit that:
receives, via a higher-level core network, a relocation request from a base station control apparatus in a macro/micro network of a moving source of a mobile station,
searches said management table to identify femto cells that use an identical scrambling code, and identifies said femto cells by referring only to said management table without referring to information identifying the mobile station; and
transfers said relocation request from said macro/micro network of said moving source to said femto base stations that use said identical scrambling code, and notifies an acknowledgement of said relocation request to said base station control apparatus via said higher-level core network, upon receipt of a relocation request acknowledge message from said femto base stations to achieve mobility of said mobile station between said macro/micro network and a femto network.

* * * * *